(12) United States Patent
Sagawa et al.

(10) Patent No.: US 12,245,342 B2
(45) Date of Patent: Mar. 4, 2025

(54) ILLUMINATION DEVICE INCLUDING CONTROL DEVICE THAT VARIES MELANOPIC RATIO OF LIGHT

(71) Applicant: NICHIA CORPORATION, Anan (JP)

(72) Inventors: Takehiro Sagawa, Okaya (JP); Yoshinori Shinohara, Chino (JP); Naoki Nakamura, Nagano (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/048,037

(22) Filed: Oct. 20, 2022

(65) Prior Publication Data

US 2023/0126841 A1    Apr. 27, 2023

(30) Foreign Application Priority Data

Oct. 21, 2021    (JP) .................................. 2021-172621

(51) Int. Cl.
 H05B 45/20    (2020.01)
(52) U.S. Cl.
 CPC .................... H05B 45/20 (2020.01)
(58) Field of Classification Search
 CPC ............... H05B 45/20; Y02B 20/40
 See application file for complete search history.

(56) References Cited

U.S. PATENT DOCUMENTS

| | | | |
|---|---|---|---|
| 2010/0060195 A1 | 3/2010 | Tsuboi et al. | |
| 2010/0063566 A1 | 3/2010 | Uchiumi et al. | |
| 2011/0037080 A1* | 2/2011 | Emerson | H01L 25/0753 257/E33.056 |
| 2013/0140988 A1 | 6/2013 | Maxik et al. | |
| 2016/0366746 A1 | 12/2016 | van de Ven et al. | |
| 2016/0380163 A1* | 12/2016 | Horie | H05B 45/22 257/98 |
| 2017/0325310 A1 | 11/2017 | Chen et al. | |
| 2020/0281062 A1 | 9/2020 | Van Bommel et al. | |
| 2020/0290508 A1 | 9/2020 | Stigler et al. | |
| 2020/0329539 A1* | 10/2020 | Haraguchi | H05B 45/10 |
| 2020/0405997 A1* | 12/2020 | Shan | H01L 33/504 |
| 2021/0160979 A1 | 5/2021 | Haraguchi et al. | |

(Continued)

FOREIGN PATENT DOCUMENTS

| | | |
|---|---|---|
| JP | 2009-259639 A | 11/2009 |
| JP | 2010-092993 A | 4/2010 |

(Continued)

*Primary Examiner* — Raymond R Chai
(74) *Attorney, Agent, or Firm* — Global IP Counselors, LLP

(57) ABSTRACT

An illumination device includes a light-emitting device and a control device. The light-emitting device is configured to emit at least light of a first color temperature having a correlated color temperature in a range from 3500 K to 8000 K, the light having a melanopic ratio of a prescribed value within a variation range of the melanopic ratio in which a gap between a maximum value and a minimum value of the melanopic ratio at the first color temperature is 0.30 or more. The control device is configured to control the light emitted from the light-emitting device, within a predetermined amount of time, by varying the melanopic ratio of the light by 0.3 or more, and adjusting the correlated color temperature of the light in a range from 0 K to ±500 K with respect to the first color temperature.

21 Claims, 8 Drawing Sheets

(56) References Cited

U.S. PATENT DOCUMENTS

| | | | |
|---|---|---|---|
| 2022/0210881 A1* | 6/2022 | Lee | H05B 45/20 |
| 2023/0010312 A1 | 1/2023 | Haraguchi et al. | |
| 2023/0296223 A1* | 9/2023 | Oepts | F21V 5/007 |
| | | | 362/231 |

FOREIGN PATENT DOCUMENTS

| | | | |
|---|---|---|---|
| JP | 2012-064860 A | 3/2012 | |
| JP | 2015-523671 A | 8/2015 | |
| JP | 2018-531478 A | 10/2018 | |
| JP | 2019-009126 A | 1/2019 | |
| JP | 2020-136597 A | 8/2020 | |
| JP | 2020-136619 A | 8/2020 | |
| JP | 2020-174035 A | 10/2020 | |
| JP | 2020-529723 A | 10/2020 | |
| JP | 2020-533754 A | 11/2020 | |
| WO | 2008/069101 A1 | 6/2008 | |
| WO | 2008069103 A1 | 6/2008 | |
| WO | 2013/085978 A2 | 6/2013 | |
| WO | 2016/199101 A2 | 12/2016 | |

* cited by examiner

ILLUMINATION DEVICE INCLUDING CONTROL DEVICE THAT VARIES MELANOPIC RATIO OF LIGHT

CROSS-REFERENCE TO RELATED APPLICATION

This application claims priority to Japanese Patent Application No. 2021-172621, filed on Oct. 21, 2021, the disclosure of which is hereby incorporated herein by reference in its entirety.

BACKGROUND

The present invention relates to an illumination device.

Illumination is an essential element in an office building, a factory, a commercial facility, or a building such as a house. When a building forming an indoor space is constructed, illumination for illuminating the space is also generally provided.

Such indoor illumination, except for some applications such as emergency lights, is typically intended to provide a room in which a person can work easily. Conventionally, color rendering properties and luminous efficiency (power saving) have been used as factors for determining the performance of indoor illumination.

Meanwhile, in recent years, the idea of human centric lighting (hereinafter referred to as "HCL") has been emphasized. Further, there has also been a movement that quantitatively evaluates illumination in terms of HCL. For example, a certification system called WELL Certification (WELL Building Standard) established by IWBI (International WELL Building Institute) comprehensively evaluates buildings such as offices based on multiple items such as air, water, food, light, and comfort, and certification is given when a certain standard value or more is satisfied.

As a method of evaluating illumination that is excellent in HCL, evaluation parameters such as an Equivalent Melanopic Lux (hereinafter referred to as EML) and a Melanopic Ratio (hereinafter referred to as MR) are used. In Japanese Patent Publication No. 2020-529723, illumination suitable for HCL is studied using a melanopic daylight equivalent efficiency factor as an evaluation parameter, which may or may not be synonymous with these parameters, but is at least considered analogous to them.

SUMMARY

One object of the present disclosure is to provide an illumination device in consideration of HCL.

An illumination device according to an embodiment includes a light-emitting device and a control device. The light-emitting device is configured to emit at least light of a first color temperature having a correlated color temperature in a range from 3500 K to 8000 K, the light having a melanopic ratio of a prescribed value within a variation range of the melanopic ratio in which a gap between a maximum value and a minimum value of the melanopic ratio at the first color temperature is 0.30 or more. The control device is configured to control the light emitted from the light-emitting device, within a predetermined amount of time, by varying the melanopic ratio of the light by 0.3 or more, and adjusting the correlated color temperature of the light in a range from 0 K to ±500 K with respect to the first color temperature.

According to the present disclosure, it is possible to provide illumination in consideration of HCL.

DETAILED DESCRIPTION

First, the EML and MR will be described. The EML and MR can be said to be evaluation parameters related to circadian rhythm. The human circadian rhythm is about 25 hours, which is longer than one day, and if not matched to one day, i.e., a 24-hour period, the rhythm cycle will deviate from one day. Therefore, light plays an important part as a synchronization factor for matching the circadian rhythm to 24 hours. Since exposure to sunlight adjusts a person's biological clock to 24 hours, that person naturally lives in the daily rhythm of getting up in the morning and sleeping at night.

That is, the human body is equipped with a synchronization mechanism utilizing light to live rhythmically in a 24-hour period. Specifically, there is a very small region called the suprachiasmatic nucleus in the hypothalamus of the brain that plays the role of a biological clock governing the circadian rhythm. As a cell which gives an optical signal to the suprachiasmatic nucleus, there is an intrinsically photosensitive Retinal Ganglion Cell (hereinafter referred to as ipRGC) on the retina.

It has been shown that the ipRGC contains the photoreceptor protein melanopsin, and the melanopsin is involved in the photoentrainment of the circadian rhythm. Since melanopsin has absorption characteristics corresponding to the wavelength of light, it is conceivable to control the amount of stimulation to the ipRGC by utilizing the spectral sensitivity characteristics of melanopsin.

In addition, melanopsin is also considered to be involved in the secretion or suppression of melatonin, which is a sleep-promoting hormone. For example, it is considered that the secretion of melatonin is suppressed by an increase in the amount of stimulation to the ipRGC. Normally, the peak of melatonin secretion in the body occurs at night, and melatonin secretion promotes sleep. Therefore, the secretion of melatonin is suppressed in days.

MR is calculated by the following formula (1).

$$\text{Melanopic Ratio} = \frac{\sum_{730}^{380} \text{Light} \times \text{Circadian}}{\sum_{730}^{380} \text{Light} \times \text{Visual}} \times 1.218 \quad (1)$$

Figure 1:
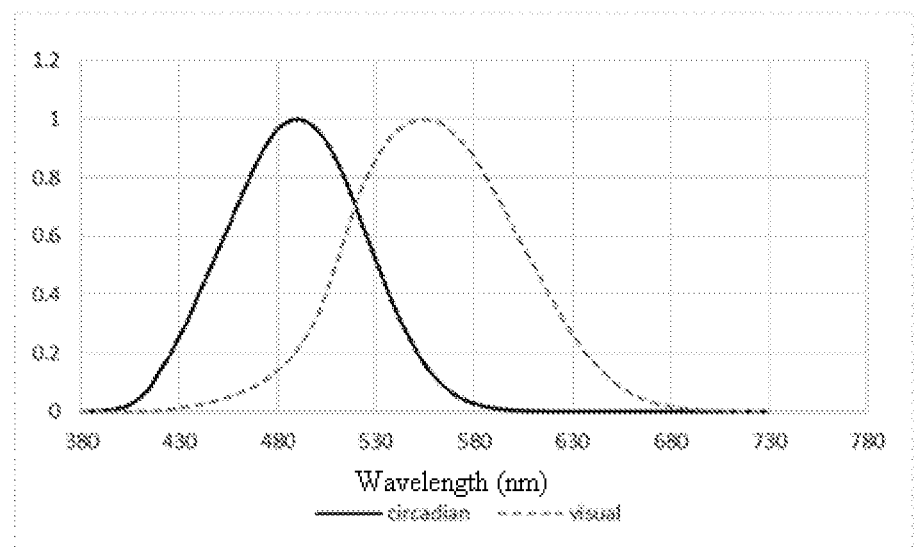
FIG. 1 is a diagram illustrating curves of a circadian response and a visual sensitivity response.

Here, Light represents a spectral distribution of light by an illumination lamp, Circadian represents a circadian response based on the spectral sensitivity characteristics of melanopsin described above, and Visual represents a visual sensitivity response. FIG. 1 is a diagram illustrating curves of the circadian response and the visual sensitivity response.

Furthermore, EML is calculated by the following formula (2).

$$\text{EML} = \text{LUX} \times \text{Melanopic Ratio} \quad (2)$$

Since circadian rhythms adjust in accordance with the natural movement of the earth, as a guideline for studying HCL, it is conceivable for illumination to be tuned with natural light such as sunlight. For example, the MR value calculated from sunlight varies depending on that day's movement. Since the degree of this variation is affected by weather conditions, latitude and longitude, direction, etc., it is not always the same every day, but it can be said to be a useful approach for considering HCL.

As an example, a result of calculating an MR value at a predetermined correlated color temperature based on a standard light source is illustrated in Table 1. As illustrated in Table 1, when the correlated color temperature is modulated from 2700 K to 6500 K, the MR value varies by about 0.6. This MR value can be used as a kind of pseudo index.

TABLE 1

| CCT [K] | 6500 | 5000 | 4000 | 3500 | 3000 | 2700 |
|---|---|---|---|---|---|---|
| MR | 1.104 | 0.935 | 0.781 | 0.688 | 0.581 | 0.51 |

Hereinafter, embodiments of the present invention will be described with reference to the drawings. The following embodiments are for embodying the technical concept of the present invention, and are not intended to limit the present invention. Further, in the following description, members having the same terms and reference signs represent the same members or members of the same quality, and the detailed description thereof will be omitted as appropriate.

Note that, size, positional relationship, or the like of members illustrated in the drawings can be exaggerated for clarity of description. Note that the relationship between the color name and the chromaticity-coordinate, the relationship between the wavelength range of light and the color name of monochromatic light, etc. are in accordance with JIS Z8110.

First Embodiment

Figure 2:
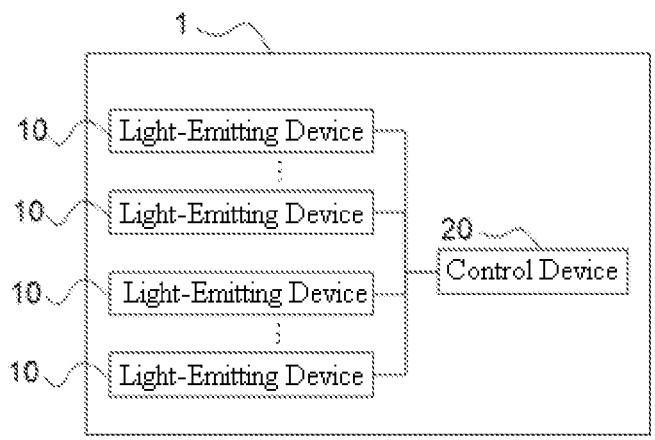
FIG. 2 is a schematic diagram for illustrating an illumination device according to a first embodiment.
Figure 3:
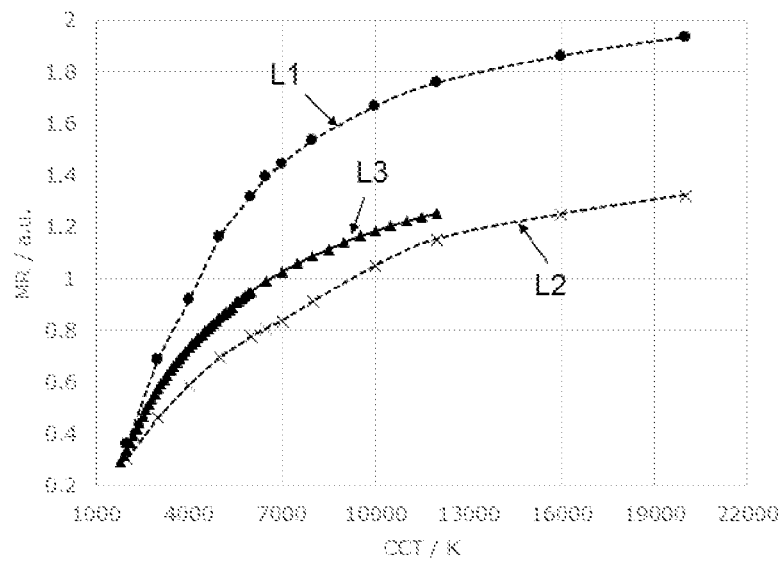
FIG. 3 is a correlation diagram of a correlated color temperature and a melanopic ratio of illumination light emitted from the illumination device according to the first embodiment.
Figure 5A:
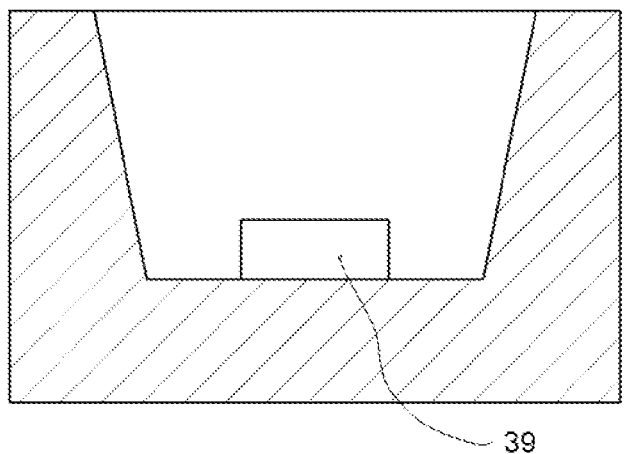
FIG. 5A is a schematic diagram illustrating an example of a configuration of a light-emitting device of the illumination device according to the first embodiment.
Figure 5B:
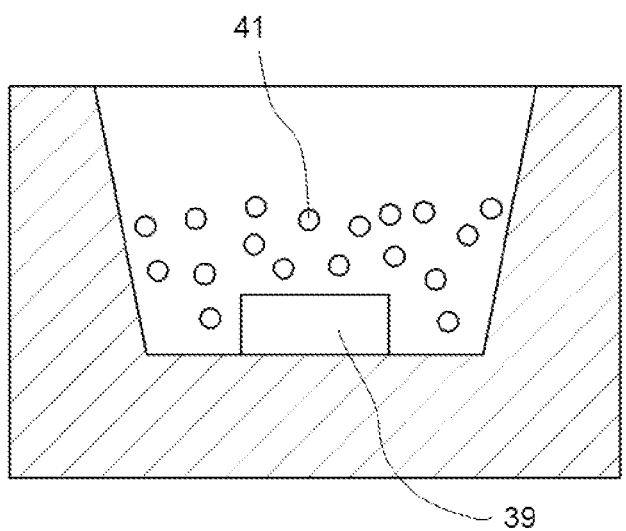
FIG. 5B is a schematic diagram illustrating another example of the configuration of the light-emitting device of the illumination device according to the first embodiment.
Figure 6:
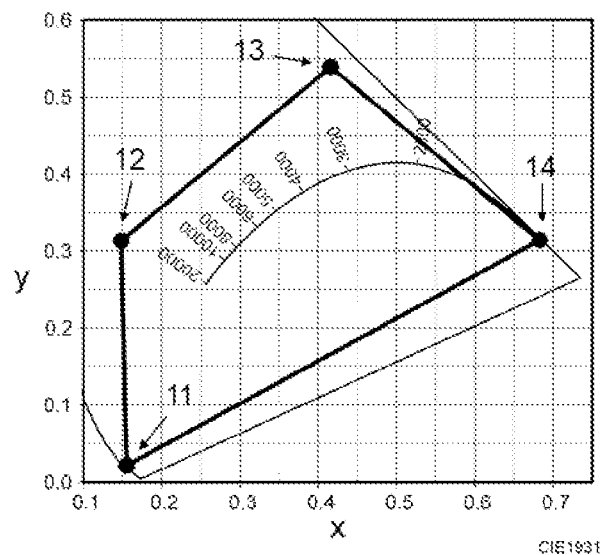
FIG. 6 is a chromaticity diagram illustrating an example of chromaticity points of a plurality of lights included in the illumination device according to the first embodiment.
Figure 7:
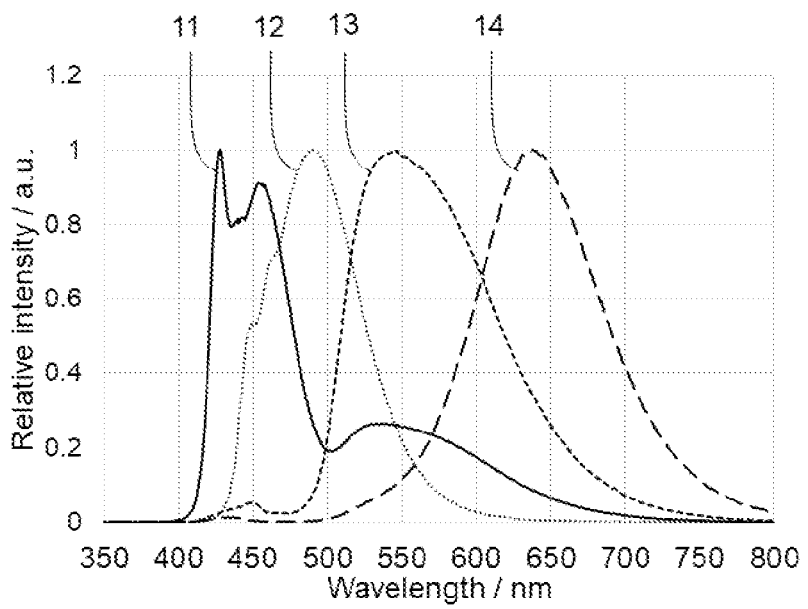
FIG. 7 is a diagram illustrating an example of emission spectra of the plurality of lights included in the illumination device according to the first embodiment.
Figure 8:
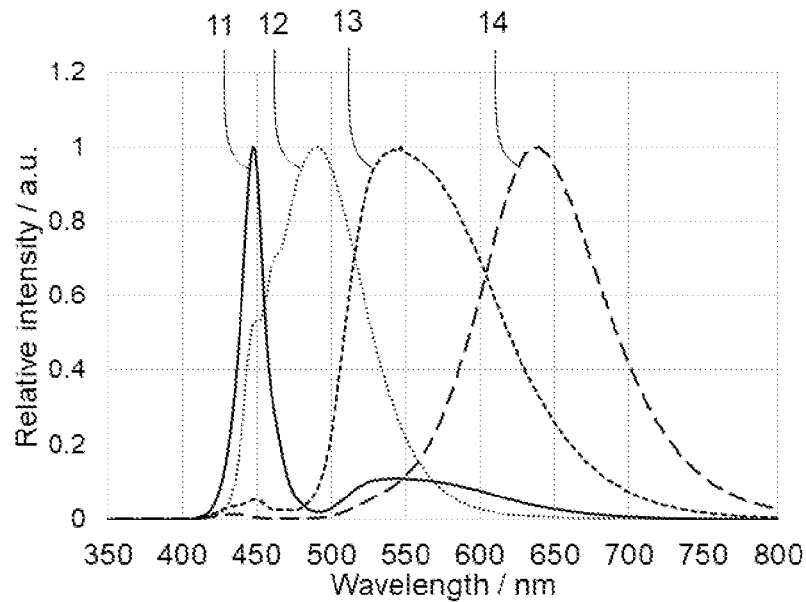
FIG. 8 is a diagram illustrating another example of the emission spectra of the plurality of lights included in the illumination device according to the first embodiment.

An illumination device 1 according to a first embodiment will be described. FIG. 2 is a schematic diagram illustrating an example of a configuration of the illumination device 1. FIG. 3 is a correlation diagram of a correlated color temperature and the MR of illumination emitted from the illumination device. FIGS. 4A to 4E are diagrams illustrating an example of a method of controlling illumination in the illumination device 1. FIGS. 5A and 5B each illustrate an example of a configuration of a light-emitting device 10. FIG. 6 is a diagram illustrating chromaticity points on a chromaticity diagram of first light to fourth light as an example of a plurality of lights included in the illumination device 1. FIGS. 7 and 8 are diagrams illustrating examples of emission spectra of the first light to fourth light included in the illumination device 1, respectively.

The illumination device 1 includes the light-emitting device 10 and a control device 20. The light-emitting device 10 emits light for illumination. The illumination device 1 includes a plurality of the light-emitting devices 10. The control device 20 controls one or more light-emitting devices 10. The control device 20 controls the light for illumination emitted from the light-emitting device 10 in consideration of HCL.

FIG. 3 illustrates light that can be emitted from the light-emitting device 10 based on a relationship between the correlated color temperature and the MR. A curve L1 indicates a maximum value of the MR value relative to the correlated color temperature of the light emitted from the light-emitting device 10. A curve L2 indicates a minimum value of the MR value relative to the correlated color temperature of the light emitted from the light-emitting device 10. In FIG. 3, a region sandwiched between two curves is a range of light that can be emitted from the light-emitting device 10.

As illustrated in FIG. 3, the light-emitting device 10 can emit light having a correlated color temperature of 1800 K or more. The light-emitting device 10 can emit light having different MR values at the same correlated color temperature. The illumination device 1 can change the MR value at the same correlated color temperature by controlling the light-emitting device 10 using the control device 20. This makes it possible to control illumination such that the MR value is varied while maintaining the correlated color temperature. Note that the light-emitting device 10 may emit light at least in a range of the correlated color temperature to be controlled.

A curve L3 in FIG. 3 is an example illustrating the MR value with respect to the correlated color temperature of light emitted by a light-emitting device that cannot change the MR value while maintaining a specific correlated color temperature. For example, when the color temperature is controlled by two-color light distribution of light having a high correlated color temperature and light having a low correlated color temperature, since the MR value is uniquely determined at a specific correlated color temperature, the MR value cannot be controlled so as to be changed at the same correlated color temperature. Note that the two-color light distribution is a general form in an illumination device.

Table 2 is a table illustrating the MR values of the curves L1, L2, and L3 at predetermined correlated color temperatures (CCT) and gaps between values of the curves L1 (maximum value of the MR) and L2 (minimum value of the MR) at the same correlated color temperatures. Hereinafter, a gap between the maximum value of the MR at a certain correlated color temperature and the minimum value of the MR at a correlated color temperature equal to or lower than the correlated color temperature is referred to as an MR gap. It can be said that the MR gap in Table 2 is a possible variation range of the MR at the same correlated color temperature in the light-emitting device 10.

TABLE 2

| CCT | MR values of the curves L1 | MR values of the curves L2 | Gap | MR values of the curves L3 |
| --- | --- | --- | --- | --- |
| 1800 | 0.31 | 0.27 | 0.04 | 0.29 |
| 2000 | 0.36 | 0.32 | 0.04 | 0.34 |
| 2200 | 0.43 | 0.35 | 0.08 | 0.39 |
| 2500 | 0.53 | 0.39 | 0.14 | 0.47 |
| 2700 | 0.59 | 0.42 | 0.17 | 0.52 |
| 3000 | 0.68 | 0.45 | 0.23 | 0.57 |
| 3500 | 0.82 | 0.52 | 0.30 | 0.66 |
| 4000 | 0.94 | 0.57 | 0.37 | 0.73 |
| 4500 | 1.05 | 0.63 | 0.42 | 0.79 |
| 5000 | 1.15 | 0.68 | 0.47 | 0.85 |
| 5500 | 1.24 | 0.73 | 0.51 | 0.91 |
| 6000 | 1.31 | 0.77 | 0.54 | 0.95 |
| 6500 | 1.38 | 0.82 | 0.56 | 0.99 |
| 7000 | 1.44 | 0.86 | 0.58 | 1.03 |
| 8000 | 1.53 | 0.91 | 0.62 | 1.09 |

Based on FIG. 3 and Table 2, the following can be said about the light-emitting device 10.

When the correlated color temperature is in a range of 1800 K to 8000 K, the MR gap monotonically increases. That is, in the light-emitting device 10, the MR gap at a specific correlated color temperature is greater than the MR gap at a correlated color temperature that is lower than the specific correlated color temperature. For example, in a case in which the light-emitting device 10 has an MR gap of 0.2 or more for light having a correlated color temperature of 3000 K, the light-emitting device 10 has an MR gap of 0.2 or more for any of correlated color temperatures in a range from 3000 K to 8000 K.

Note that the light-emitting device 10 does not have to always realize the MR gap realized at a specific correlated color temperature even at a correlated color temperature that is equal to or higher than the specific correlated color temperature. The present embodiment is an exemplary embodiment, and it is sufficient that the light-emitting device 10 may only realize the MR gap at any one of correlated color temperatures equal to or higher than a specific correlated color temperature in a range from 1800 K to 8000 K. In the above-described example, the light-emitting device 10 does not realize an MR gap of 0.2 or more in light having correlated color temperatures in an entire range from 3000 K to 8000 K, and it is sufficient that the light-emitting device 10 may realize only an MR gap of 0.2 or more in light having predetermined correlated color temperatures in a range from 3000 K to 8000 K.

The light-emitting device 10 can emit light of a first color temperature having a correlated color temperature in a range from 3500 K to 8000 K. The MR gap of light of the first color temperature emitted from the light-emitting device 10 is 0.30 or more. The light-emitting device 10 can emit light of the first color temperature having an MR of an arbitrary value (a prescribed value) within a variation range of the MR having an MR gap of 0.30 or more.

In the light-emitting device 10, the correlated color temperature of the first color temperature can be in a range from 3500 K to 4000 K. The variation range of the MR in the light of the first color temperature (hereinafter referred to as a first variation range) can include the MR value from 0.65 to 0.75. Also, the first variation range can include the MR value from 0.60 to 0.80. Further, the first variation range can include the MR value from 0.55 to 0.80.

The light-emitting device 10 can emit light of a second color temperature having a correlated color temperature in a range from 4000 K to 8000 K. The MR gap of light of the second color temperature emitted from the light-emitting device 10 is 0.35 or more. The light-emitting device 10 can emit light of the second color temperature having an MR of an arbitrary value within a variation range of the MR having an MR gap of 0.35 or more.

In the light-emitting device 10, the correlated color temperature of the second color temperature can be in a range from 4000 K to 4500 K. The variation range of the MR in the light of the second color temperature (hereinafter referred to as a second variation range) can include the MR value from 0.70 to 0.80. Further, the second variation range can include the MR value from 0.65 to 0.85. Also, the second variation range can include the MR value from 0.60 to 0.90.

The light-emitting device 10 can emit light of a third color temperature having a correlated color temperature in a range from 4500 K to 8000 K. The MR gap of light of the third color temperature emitted from the light-emitting device 10 is 0.40 or more. The light-emitting device 10 can emit light of the third color temperature having an MR of an arbitrary value within a variation range of the MR having an MR gap of 0.40 or more.

In the light-emitting device 10, the correlated color temperature of the third color temperature can be in a range from 4500 K to 5000 K. The variation range of the MR in the light of the third color temperature (hereinafter referred to as a third variation range) can include the MR value from 0.80 to 0.90. Further, the third variation range can include the MR value from 0.75 to 0.95. Also, the third variation range can include the MR value from 0.70 to 1.00.

The light-emitting device 10 can emit light of a fourth color temperature having a correlated color temperature in a range from 5000 K to 8000 K. The MR gap of light of the fourth color temperature emitted from the light-emitting device 10 is 0.45 or more. The light-emitting device 10 can emit light of the fourth color temperature having an MR of an arbitrary value within a variation range of the MR having an MR gap of 0.45 or more.

In the light-emitting device 10, the correlated color temperature of the fourth color temperature can be in a range from 5000 K to 5500 K. The variation range of the MR in the light of the fourth color temperature (hereinafter referred to as a fourth variation range) can include the MR value from 0.90 to 1.00. Also, the fourth variation range can include the MR value from 0.85 to 1.05. Also, the fourth variation range can include the MR value from 0.80 to 1.10. Also, the fourth variation range can include the MR value from 0.70 to 1.10.

The light-emitting device 10 can emit light of a fifth color temperature having a correlated color temperature in a range from 5500 K to 8000 K. The MR gap of light of the fifth color temperature emitted from the light-emitting device 10 is 0.50 or more. The light-emitting device 10 can emit light of the fifth color temperature having an MR of an arbitrary value within a variation range of the MR having an MR gap of 0.50 or more.

In the light-emitting device 10, the correlated color temperature of the fifth color temperature can be in a range from 5500 K to 6000 K. The variation range of the MR in the light of the fifth color temperature (hereinafter referred to as a fifth variation range) can include the MR value from 0.95 to 1.05. Also, the fifth variation range can include the MR value from 0.90 to 1.10. Also, the fifth variation range can include the MR value from 0.85 to 1.15. Also, the fifth variation range can include the MR value from 0.80 to 1.15. Also, the fifth variation range can include the MR value from 0.75 to 1.15.

The light-emitting device 10 can emit light of a sixth color temperature having a correlated color temperature in a range from 6000 K to 8000 K. The MR gap of light of the sixth color temperature emitted from the light-emitting device 10 is 0.50 or more. The light-emitting device 10 can emit light of the sixth color temperature having an MR of an arbitrary value within a variation range of the MR having an MR gap of 0.50 or more.

In the light-emitting device 10, the correlated color temperature of the sixth color temperature can be in a range from 6000 K to 6500 K. The variation range of the MR in the light of the sixth color temperature (hereinafter referred to as a sixth variation range) can include the MR value from 1.00 to 1.10. Also, the sixth variation range can include the MR value from 0.95 to 1.15. Also, the sixth variation range can include the MR value from 0.90 to 1.20. Also, the sixth variation range can include the MR value from 0.85 to 1.25. Also, the sixth variation range can include the MR value from 0.80 to 1.30.

The light-emitting device 10 can emit light of a seventh color temperature having a correlated color temperature in a range from 6500 K to 8000 K. The MR gap of light of the seventh color temperature emitted from the light-emitting device 10 is at least 0.55 or more. The light-emitting device 10 can emit light of the seventh color temperature having an MR of an arbitrary value within a variation range of the MR having an MR gap of 0.55 or more.

In the light-emitting device 10, the correlated color temperature of the seventh color temperature can be in a range from 6500 K to 7000 K. The variation range of the MR in the light of the seventh color temperature (hereinafter referred to as a seventh variation range) can include the MR value from 1.05 to 1.15. Also, the seventh variation range can include the MR value from 1.00 to 1.20. Also, the seventh variation range can include the MR value from 0.95 to 1.25. Also, the seventh variation range can include the MR value from 0.90 to 1.30. Also, the seventh variation range can include the MR value from 0.85 to 1.35.

By using the above-described characteristics related to the first color temperature to the seventh color temperature, the control device 20 can perform control to vary the MR value at a specific correlated color temperature and emit light for illumination. For example, it is possible to perform control to change the MR value in accordance with a daily rhythm while keeping the correlated color temperature substantially constant.

The control device 20 can control the light-emitting device 10 such that the light emitted from the light-emitting device 10 is adjusted to have a correlated color temperature of an L-th color temperature (L is a natural number of 1 to 7) and the MR is varied within the above-described MR gap range for the L-th color temperature. For example, the control device 20 controls the light-emitting device 10 to vary the MR by 0.30 or more, and adjust the light emitted from the light-emitting device 10 to the correlated color temperature of the first color temperature. Note that the adjustment to keep the correlated color temperature constant need not be performed to exactly the same color temperature. For example, the color temperature may be adjusted in a range from the L-th color temperature to ±100 K of the L-th color temperature. For example, the color temperature may be adjusted in a range from the L-th color temperature to the MacAdam ellipse 3-Step. Also, for example, the color temperature may be adjusted in a range from the L-th color temperature to ±5% of the L-th color temperature.

As illustrated in Table 1, based on the standard light source, the MR gap is about 0.6 between the correlated color temperature of 2700 K and the correlated color temperature of 6500 K. Therefore, when the correlated color temperature of the standard light source is modulated from 2700 K to 6500 K, the MR value varies by about 0.6. For example, when it is desired to achieve an equivalent MR gap while adjusting the correlated color temperature to be constant, it is sufficient that the control device 20 may cause the light-emitting device 10 to emit light having a correlated color temperature of the seventh color temperature.

Based on the standard light source, when the correlated color temperature of the standard light source is modulated from 2700 K to 6500 K, the MR value varies in a range of 0.51 to 1.10. For example, in a case in which light having a constant correlated color temperature is emitted from the illumination device 1 as light for illumination and the MR value is to be varied within the range of this MR value, it is sufficient that the control device may cause the light-emitting device 10 to emit light having a predetermined correlated color temperature within a range from 3000 K to 5000 K.

Considering workability by an operator, it may be desirable that the correlated color temperature be constant so that there is no large change in the color of white illumination. For example, in an operation of checking the color of an object, it is not preferable that the color of the object change greatly due to a change in the color of the illumination. In addition, for a person who performs desk work, there may be a case in which daytime white light is better than incandescent light during work hours. Considering the form of a matching suitable HCL for the user's needs, it is beneficial to control the MR gap and the MR value while suppressing variations in correlated color temperature.

The control method of the light-emitting device 10 by the control device 20 is not limited to the control of varying the MR value under a constant correlated color temperature. The control device 20 can perform control of changing the MR value while changing the correlated color temperature. Therefore, the extent to which the light-emitting device 10 can vary the MR value within a specific correlated color temperature range will be described.

Here, for ease of description, a range of the correlated color temperature from 2000 K to 2500 K will be referred to as a first color temperature band, a range of the correlated color temperature from 2500 K to 3000 K is referred to as a second color temperature band, a range of the correlated color temperature from 3000 K to 3500 K is referred to as a third color temperature band, a range of the correlated color temperature from 3500 K to 4000 K is referred to as a fourth color temperature band, a range of the correlated color temperature from 4000 K to 4500 K is referred to as a fifth color temperature band, a range of the correlated color temperature from 4500 K to 5000 K is referred to as a sixth color temperature band, a range of the correlated color temperature from 5000 K to 5500 K is referred to as a seventh color temperature band, a range of the correlated color temperature from 5500 K to 6000 K is referred to as an eighth color temperature band, a range of the correlated color temperature from 6000 K to 6500 K is referred to as a ninth color temperature band, and a range of the correlated color temperature from 6500 K to 7000 K is referred to as a tenth color temperature band.

Further, "modulating light in the first color temperature band" means modulating light in a range of the correlated color temperature from 2000 K to 2500 K. Note that modulating light is not limited to modulating light continuously. Modulating light in the range of the correlated color temperature from 2000 K to 2500 K means controlling light so as to emit light of at least two different correlated color temperatures in a range in which the maximum correlated color temperature is 2500 K or less and the minimum correlated color temperature is 2000 K or more. The same applies to color temperature bands other than the first color temperature band.

Further, "modulating light from the first color temperature band to the third color temperature band" means modulating light in a range of the correlated color temperature from 2000 K to 3500 K. The same applies to the combination of other color temperature bands. In order to prevent confusion in interpretation, for example, when a range of the correlated color temperature in a range from 2500 K to 4000 K is to be specified, it is expressed as "from the second color temperature band to the fourth color temperature band" and is not expressed as "from the fourth color temperature band to the second color temperature band". That is, "from an M-th color temperature band to an N-th color temperature band" (M and N are natural numbers from 1 to 10, and M<N) means from a minimum correlated color temperature in the M-th color temperature band to a maximum correlated color temperature in the N-th color temperature band.

The MR gap in the first color temperature band of the light-emitting device 10 is 0.20 or more. Note that the MR gap in the first color temperature band is a gap between the maximum value of the MR at the maximum correlated color temperature and the minimum value of the MR at the minimum correlated color temperature in the first color temperature band. The same applies to the other color temperature bands.

The MR gap in the second color temperature band of the light-emitting device 10 is 0.25 or more. The MR gap in the third color temperature band of the light-emitting device 10 is 0.30 or more. The MR gap in the fourth color temperature band of the light-emitting device 10 is 0.35 or more. The MR gap in the fifth color temperature band of the light-emitting device 10 is 0.40 or more. The MR gap in the sixth color temperature band of the light-emitting device 10 is 0.45 or more. The MR gap in the seventh color temperature band of the light-emitting device 10 is 0.50 or more. The MR gap in the eighth color temperature band of the light-emitting device 10 is 0.55 or more. The MR gap in the ninth color temperature band of the light-emitting device 10 is 0.60 or more. The MR gap in the tenth color temperature band of the light-emitting device 10 is 0.60 or more.

An MR value of 0.40 is included within the variation range of the MR in the first color temperature band of the light-emitting device 10. An MR value of 0.50 is included within the variation range of the MR in the second color temperature band of the light-emitting device 10. An MR value of 0.60 is included within the variation range of the MR in the third color temperature band of the light-emitting device 10. An MR value of 0.70 is included within the variation range of the MR in the fourth color temperature band of the light-emitting device 10. An MR value of 0.80 is included within the variation range of the MR in the fifth color temperature band of the light-emitting device 10. An MR value of 0.90 is included within the variation range of the MR in the sixth color temperature band of the light-emitting device 10. An MR value of 0.95 is included within the variation range of the MR in the seventh color temperature band of the light-emitting device 10. An MR value of 1.05 is included within the variation range of the MR in the eighth color temperature band of the light-emitting device 10. An MR value of 1.10 is included within the variation range of the MR in the ninth color temperature band of the light-emitting device 10. An MR value of 1.15 is included within the variation range of the MR in the tenth color temperature band of the light-emitting device 10.

The MR gap from the first color temperature band to the second color temperature band of the light-emitting device 10 is 0.30 or more. Note that the MR gap from the first color temperature band to the second color temperature band is a gap between the maximum value of the MR at the maximum value of the correlated color temperature in the second color temperature band and the minimum value of the MR at the minimum value of the correlated color temperature in the first color temperature band. The same applies to the combination of other color temperature bands.

The MR gap from the first color temperature band to the third color temperature band of the light-emitting device 10 is 0.40 or more. The MR gap from the first color temperature band to the fourth color temperature band of the light-emitting device 10 is 0.50 or more. The MR gap from the first color temperature band to the fifth color temperature band of the light-emitting device 10 is 0.60 or more. The MR gap from the first color temperature band to the sixth color temperature band of the light-emitting device 10 is 0.70 or more. The MR gap from the first color temperature band to the seventh color temperature band of the light-emitting device 10 is 0.80 or more. The MR gap from the first color temperature band to the eighth color temperature band of the light-emitting device 10 is 0.90 or more. The MR gap from the first color temperature band to the ninth color temperature band of the light-emitting device 10 is 1.00 or more. The MR gap from the first color temperature band to the tenth color temperature band of the light-emitting device 10 is 1.10 or more.

The MR gap from the second color temperature band to the third color temperature band of the light-emitting device 10 is 0.35 or more. The MR gap from the second color temperature band to the fourth color temperature band of the light-emitting device 10 is 0.45 or more. The MR gap from the second color temperature band to the fifth color temperature band of the light-emitting device 10 is 0.55 or more. The MR gap from the second color temperature band to the sixth color temperature band of the light-emitting device 10 is 0.65 or more. The MR gap from the second color temperature band to the seventh color temperature band of the light-emitting device 10 is 0.75 or more. The MR gap from the second color temperature band to the eighth color temperature band of the light-emitting device 10 is 0.85 or more. The MR gap from the second color temperature band to the ninth color temperature band of the light-emitting device 10 is 0.90 or more. The MR gap from the second color temperature band to the tenth color temperature band of the light-emitting device 10 is 1.00 or more.

The MR gap from the third color temperature band to the fourth color temperature band of the light-emitting device 10 is 0.40 or more. The MR gap from the third color temperature band to the fifth color temperature band of the light-emitting device 10 is 0.50 or more. The MR gap from the third color temperature band to the sixth color temperature band of the light-emitting device 10 is 0.60 or more. The MR gap from the third color temperature band to the seventh color temperature band of the light-emitting device 10 is 0.70 or more. The MR gap from the third color temperature band to the eighth color temperature band of the light-emitting device 10 is 0.80 or more. The MR gap from the third color temperature band to the ninth color temperature band of the light-emitting device 10 is 0.85 or more. The MR gap from the third color temperature band to the tenth color temperature band of the light-emitting device 10 is 0.95 or more.

The MR gap from the fourth color temperature band to the fifth color temperature band of the light-emitting device 10 is 0.45 or more. The MR gap from the fourth color temperature band to the sixth color temperature band of the light-emitting device 10 is 0.55 or more. The MR gap from the fourth color temperature band to the seventh color temperature band of the light-emitting device 10 is 0.65 or more. The MR gap from the fourth color temperature band to the eighth color temperature band of the light-emitting device 10 is 0.75 or more. The MR gap from the fourth color temperature band to the ninth color temperature band of the light-emitting device 10 is 0.80 or more. The MR gap from the fourth color temperature band to the tenth color temperature band of the light-emitting device 10 is 0.85 or more.

The MR gap from the fifth color temperature band to the sixth color temperature band of the light-emitting device 10 is 0.50 or more. The MR gap from the fifth color temperature band to the seventh color temperature band of the light-emitting device 10 is 0.60 or more. The MR gap from the fifth color temperature band to the eighth color temperature band of the light-emitting device 10 is 0.70 or more. The MR gap from the fifth color temperature band to the ninth color temperature band of the light-emitting device 10 is 0.75 or more. The MR gap from the fifth color temperature band to the tenth color temperature band of the light-emitting device 10 is 0.80 or more.

The MR gap from the sixth color temperature band to the seventh color temperature band of the light-emitting device 10 is 0.55 or more. The MR gap from the sixth color temperature band to the eighth color temperature band of the light-emitting device 10 is 0.60 or more. The MR gap from the sixth color temperature band to the ninth color temperature band of the light-emitting device 10 is 0.70 or more. The MR gap from the sixth color temperature band to the tenth color temperature band of the light-emitting device 10 is 0.75 or more.

The MR gap from the seventh color temperature band to the eighth color temperature band of the light-emitting device 10 is 0.55 or more. The MR gap from the seventh color temperature band to the ninth color temperature band of the light-emitting device 10 is 0.65 or more. The MR gap from the seventh color temperature band to the tenth color temperature band of the light-emitting device 10 is 0.70 or more. The MR gap from the eighth color temperature band to the ninth color temperature band of the light-emitting device 10 is 0.60 or more. The MR gap from the eighth color temperature band to the tenth color temperature band of the light-emitting device 10 is 0.65 or more. The MR gap from the ninth color temperature band to the tenth color temperature band of the light-emitting device 10 is 0.60 or more.

Note that, for example, the fact that the MR can be varied with an MR gap of 0.7 or more within a certain correlated color temperature range naturally means that the MR value can be varied with an MR gap smaller than 0.7. When it is desired to vary the MR value with an MR gap of 0.5 or 0.6 based on the standard light source, a combination of color temperature bands that achieves an MR gap of 0.5 or more or 0.6 or more may be appropriately selected from the above-described MR gaps, and then control may be performed so that the variation range of the MR value becomes 0.5 or more or 0.6 or more.

The control device 20 can control the light-emitting device 10 to adjust the color temperature in the range of the correlated color temperature that includes the desired color temperature band, while varying the MR value in the variation range described above to emit light for illumination. The control device 20 can control the light-emitting device 10 to modulate the light from the M-th color temperature band to the N-th color temperature band (M and N are natural numbers from 1 to 10, and M<N), and vary the MR in the MR gap from the M-th color temperature band to the N-th color temperature band described above. In this case, the variation range of the MR of the light modulated from the M-th color temperature band to the N-th color temperature band includes the above-described MR value included in the variation range of the MR in the M-th color temperature band and the above-described MR value included in the variation range of the MR in the N-th color temperature band.

For example, the control device 20 modulates light for illumination emitted from the light-emitting device 10 in a correlated color temperature range including at least the fourth color temperature band to the sixth color temperature band, and varies the MR value with an MR gap of 0.55 or more in the fourth color temperature band to the sixth color temperature band. In addition, the MR value of 0.70 and the MR value of 0.90 may be included in the variation range of light modulated from the fourth color temperature band to the sixth color temperature band.

It is desirable that the control device 20 control the light-emitting device 10 to vary the MR by at least 0.3 or more within a predetermined amount of time in a day. At this time, the control device 20 can adjust the correlated color temperature of the light emitted from the light-emitting device 10 in a range from 0 K to ±500 K with respect to a predetermined color temperature. As a result, the MR can be largely varied with respect to a change in the correlated color temperature, and illumination control in consideration of HCL can be performed.

Furthermore, the predetermined amount of time is several hours or more and 24 hours or less. More preferably, the control device 20 preferably controls the light-emitting device 10 to vary the MR by 0.4 or more, or alternatively 0.5 or more. Alternatively, it is desirable to vary the MR by 0.6 or more. Further, based on the MR gap from 2700 K to 6500 K of the standard light source illustrated in Table 1, variation in the MR of 0.7 or less is sufficient. By securing such a variation range of the MR, it is possible to control illumination in which the variation range of the MR in the daytime is more appropriately reflected. Note that if the MR value before the day goes up is 0, the variation in the MR corresponding thereto is 1.0 or more.

In addition, it is preferable that the control device 20 varies the MR value while suppressing the variation range of the correlated color temperature of the light emitted from the light-emitting device 10 to be within the range of appropriate white light assumed in a normal office. What range of the correlated color temperature is preferable is not unique and may vary depending on, for example, the color of the iris (the color of the eye). Therefore, a preferable range of white light may vary depending on countries or regions. For example, in Europe and the United States, the white light having correlated color temperatures similar to those of 6000 K tends not to be adopted.

Here, several examples of the variation range of the correlated color temperature when modulating the illumination light will be given. As an exemplary form, the illumination device 1 modulates light in a range of the correlated color temperature from 3000 K to 5000 K. Also, as an exemplary form, the illumination device 1 modulates light in a range of the correlated color temperature from 2700 K to 5000 K. Also, as an exemplary form, the illumination device 1 modulates light in a range of the correlated color temperature from 2700 K to 4000 K. Also, as an exemplary form, the illumination device 1 modulates light in a range of the correlated color temperature from 2200 K to 4000 K. Also, as an exemplary form, the illumination device 1 modulates light in a range of the correlated color temperature from 1800 K to 3000 K. Also, as an exemplary form, the illumination device 1 modulates light in a range of the correlated color temperature from 3000 K to 6500 K. Also, as an exemplary form, the illumination device 1 modulates light in a range of the correlated color temperature from 2700 K to 6500 K.

The MR gap and the variation range for each example described above are as follows. The illumination device 1 can realize an MR gap of 0.6 or more for the range of the correlated color temperature from 3000 K to 5000 K. Further, the MR value can be varied at least in a variation range from 0.50 to 1.10. In the illumination device 1, by performing modulation in the range of the correlated color temperature from 3000 K to 5000 K, it is possible to cover the variation range of the MR of the standard light source in the range of correlated color temperature from 2700 K to 6500 K. Note that the range of the correlated color temperature from 3000 K to 5000 K is included in the correlated color temperature from the third color temperature band to the sixth color temperature band.

The illumination device 1 can realize an MR gap of 0.65 or more for the range of the correlated color temperature from 2700 K to 5000 K. Further, the MR value can be varied at least in a variation range from 0.45 to 1.10. In the illumination device 1, by performing modulation in the range of the correlated color temperature from 2700 K to 5000 K, it is possible to cover the variation range of the MR of the standard light source in the range of correlated color temperature from 2700 K to 6500 K. Note that the MR gap of the illumination device 1 in this case may be 0.60 or more. Note that the range of the correlated color temperature from 2700 K to 5000 K is included in the correlated color temperature from the second color temperature band to the sixth color temperature band.

The illumination device 1 can realize an MR gap of 0.45 or more for the range of the correlated color temperature from 2700 K to 4000 K. Further, the MR value can be varied at least in a variation range from 0.45 to 0.90. In the illumination device 1, by performing modulation in the range of the correlated color temperature from 2700 K to 4000 K, it is possible to cover the variation range of the MR of the standard light source in the range of correlated color temperature from 2700 K to 5000 K. Note that the MR gap of the illumination device 1 in this case may be 0.40 or more. Also, the variation range of the MR may be a range including 0.50 to 0.90. Note that the range of the correlated color temperature from 2700 K to 4000 K is included in the correlated color temperature from the second color temperature band to the fourth color temperature band.

The illumination device 1 can realize an MR gap of 0.50 or more for the range of the correlated color temperature from 2200 K to 4000 K. Further, the MR value can be varied at least in a variation range from 0.40 to 0.90. Note that the range of the correlated color temperature from 2200 K to 4000 K is included in the correlated color temperature from the first color temperature band to the fourth color temperature band.

The illumination device 1 can realize an MR gap of 0.35 or more for the range of the correlated color temperature from 1800 K to 3000 K. Further, the MR value can be varied at least in a variation range from 0.30 to 0.65.

The illumination device 1 can realize an MR gap of 0.85 or more for the range of the correlated color temperature from 3000 K to 6500 K. Further, the MR value can be varied at least in a variation range from 0.50 to 1.35. Note that the range of the correlated color temperature from 3000 K to 6500 K is included in the correlated color temperature from the third color temperature band to the ninth color temperature band.

The illumination device 1 can realize an MR gap of 0.90 or more for the range of the correlated color temperature from 2700 K to 6500 K. Further, the MR value can be varied at least in a variation range from 0.45 to 1.35. Note that the range of the correlated color temperature from 2700 K to 6500 K is included in the correlated color temperature from the second color temperature band to the ninth color temperature band.

Note that the control device 20 can control the light emitted from the light-emitting device 10 not only in the range of the correlated color temperature exemplified above but also in a range including at least the range of the correlated color temperature exemplified above. In this case, the control device 20 can control the light-emitting device 10 to vary the MR value in the above-described range at least in the range of the correlated color temperature exemplified.

For example, the control device 20 causes the light-emitting device 10 to emit at least light having correlated color temperatures of 3000 K and 5000 K. Furthermore, the control device 20 controls light emitted from the light-emitting device 10 such that the difference between the minimum value of the melanopic ratio at the correlated color temperature of 3000 K and the maximum value of the melanopic ratio at the correlated color temperature of 5000 K is 0.35 or more, 0.40 or more, 0.45 or more, 0.50 or more, 0.55 or more, 0.60 or more, 0.65 or more, or alternatively 0.70 or more.

For example, the control device 20 causes the light-emitting device 10 to emit at least light having correlated color temperatures of 2700 K and 5000 K. Furthermore, the control device 20 controls light emitted from the light-emitting device 10 such that the difference between the minimum value of the melanopic ratio at the correlated color temperature of 2700 K and the maximum value of the melanopic ratio at the correlated color temperature of 5000 K is 0.35 or more, 0.40 or more, 0.45 or more, 0.50 or more, 0.55 or more, 0.60 or more, 0.65 or more, or alternatively 0.70 or more.

For example, the control device 20 causes the light-emitting device 10 to emit at least light having correlated color temperatures of 2700 K and 4000 K. Furthermore, the control device 20 controls light emitted from the light-emitting device 10 such that the difference between the minimum value of the melanopic ratio at the correlated color temperature of 2700 K and the maximum value of the melanopic ratio at the correlated color temperature of 4000

K is 0.25 or more, 0.30 or more, 0.35 or more, or 0.40 or more, and 0.45 or more, or alternatively 0.50 or more.

For example, the control device 20 causes the light-emitting device 10 to emit at least light having correlated color temperatures of 2200 K and 4000 K. Furthermore, the control device 20 controls light emitted from the light-emitting device 10 such that the difference between the minimum value of the melanopic ratio at the correlated color temperature of 2200 K and the maximum value of the melanopic ratio at the correlated color temperature of 4000 K is 0.35 or more, 0.40 or more, 0.45 or more, 0.50 or more, or alternatively 0.55 or more.

For example, the control device 20 causes the light-emitting device 10 to emit at least light having correlated color temperatures of 1800 K and 3000 K. Furthermore, the control device 20 controls light emitted from the light-emitting device 10 such that the difference between the minimum value of the melanopic ratio at the correlated color temperature of 1800 K and the maximum value of the melanopic ratio at the correlated color temperature of 3000 K is 0.30 or more, 0.35 or more, or alternatively 0.40 or more.

For example, the control device 20 causes the light-emitting device 10 to emit at least light having correlated color temperatures of 3000 K and 6500 K. Furthermore, the control device 20 controls light emitted from the light-emitting device 10 such that the difference between the minimum value of the melanopic ratio at the correlated color temperature of 3000 K and the maximum value of the melanopic ratio at the correlated color temperature of 6500 K is 0.45 or more, 0.50 or more, 0.55 or more, 0.60 or more, 0.65 or more, 0.70 or more, 0.75 or more, 0.80 or more, 0.85 or more, or alternatively 0.90 or more.

For example, the control device 20 causes the light-emitting device 10 to emit at least light having correlated color temperatures of 2700 K and 6500 K. Furthermore, the control device 20 controls light emitted from the light-emitting device 10 such that the difference between the minimum value of the melanopic ratio at the correlated color temperature of 2700 K and the maximum value of the melanopic ratio at the correlated color temperature of 6500 K is 0.50 or more, 0.55 or more, 0.60 or more, 0.65 or more, 0.70 or more, 0.75 or more, 0.80 or more, 0.85 or more, 0.90 or more, or alternatively 0.95 or more.

FIGS. 4A to 4E illustrate a control method by the control device 20. These drawings illustrate the correlated color temperature and MR at which illumination light is emitted from the illumination device 1 during one day (from 0:00 to 24:00). The solid line indicates the value of the correlated color temperature to be controlled, and the dashed line indicates the MR value to be controlled.

As illustrated in FIGS. 4A to 4E, the illumination device 1 can change the correlated color temperature or the MR value of light for illumination at a predetermined amount of time in one day by the control device 20 controlling the one or more light-emitting devices 10. The predetermined amount of time may be 24 hours or may be, for example, from 9:00 to 17:00. How to control the illumination in any time period can be determined in accordance with the user's needs. The control device 20 controls the light-emitting device 10 based on rule information determined how to control the illumination in any time period. The rule information may be held by the control device 20, or may be held by a management device communicably connected to the illumination device 1. FIG. 4A to 4E are diagrams in which an example of a mode controlled based on the rule information is visualized in an easily understandable manner. Hereinafter, each example will be described.

Figure 4A:
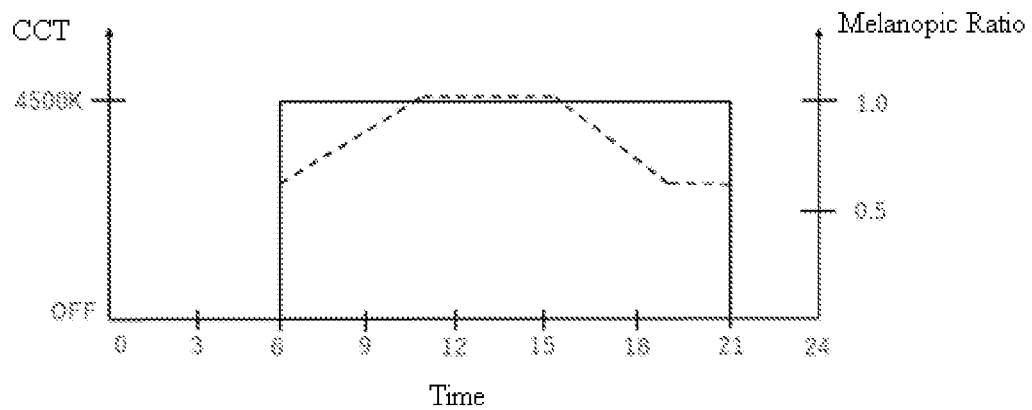
FIG. 4A is a diagram illustrating an example of a method of controlling illumination in the illumination device according to the first embodiment.

FIG. 4A illustrates an example of control for emitting light for illumination by varying the MR value while keeping the correlated color temperature constant for a predetermined amount of time. In this example, the predetermined amount of time controlled by the control device 20 is from 6:00 to 21:00. That is, the control of the illumination device 1 is ON from 6:00 to 21:00, and the control of the illumination device 1 is OFF from 21:00 to 6:00. Although the control by the control device 20 is OFF, the illumination may be manually turned on from 21:00 to 6:00. Alternatively, the control by the control device 20 may be performed so that the illumination device 1 is OFF from 21:00 to 6:00.

Within a predetermined amount of time, the control device 20 controls the light-emitting device 10 to vary the MR value within a range from 0.17 to 0.56, and adjust the light emitted from the light-emitting device 10 to the constant correlated color temperature within a range of ±100 K or less from a predetermined correlated color temperature. In FIG. 4A, the control device 20 keeps the correlated color temperature constant in 4500 K and varies the MR value so that the difference between the maximum MR value and the minimum MR value is within a range from 0.35 to 0.45. In this manner, it is possible to provide illumination in consideration of HCL while keeping the correlated color temperature constant.

The control by the control device 20 includes control for increasing the MR value while keeping the correlated color temperature constant in a certain time period in the morning. The control by the control device 20 includes control for keeping the correlated color temperature constant and keeping the MR value constant in a certain time period between 12:00 and 15:00. The control by the control device 20 includes control for decreasing the MR value while keeping the correlated color temperature constant in a certain time period between 15:00 and 18:00. The control of the light-emitting device 10 by the control device 20 includes control for keeping the correlated color temperature constant and keeping the MR value constant in a certain time period after 18:00.

While keeping the correlated color temperature constant, the control device 20 emits light for illumination having an MR value lower than that of the standard light source at the correlated color temperature at a certain time, emits light for illumination having an MR value equal to that of the standard light source at the correlated color temperature at another certain time, and emits light for illumination having an MR value higher than that of the standard light source at the correlated color temperature at another certain time. As a result, since the correlated color temperature is constant, it is possible to realize not only the MR of the same correlated color temperature in the standard light source but also the MR of a higher or lower correlated color temperature while suppressing a visible difference in the illumination.

The control device 20 causes the light-emitting device 10 to emit light having a predetermined correlated color temperature, the light having the same MR value as the MR value of the standard light source at a correlated color temperature lower than the predetermined correlated color temperature in a range from 500 K to 1500 K. The control device 20 can cause the light-emitting device 10 to emit light having a predetermined correlated color temperature, the light having an MR corresponding to the MR value of the standard light source at a correlated color temperature 500 K lower than the predetermined correlated color temperature, or having an MR corresponding to the MR value of the standard light source at a correlated color temperature 1000 K lower than the predetermined correlated color temperature.

The control device 20 causes the light-emitting device 10 to emit light having a predetermined correlated color temperature, the light having the same MR value as the MR value of the standard light source at a correlated color temperature higher than the predetermined correlated color temperature in a range from 500 K to 1500 K. The control device 20 can cause the light-emitting device 10 to emit light having a predetermined correlated color temperature, the light having an MR corresponding to the MR value of the standard light source at a correlated color temperature 500 K higher than the predetermined correlated color temperature, or having an MR corresponding to the MR value of the standard light source at a correlated color temperature 1000 K higher than the predetermined correlated color temperature.

Figure 4B:
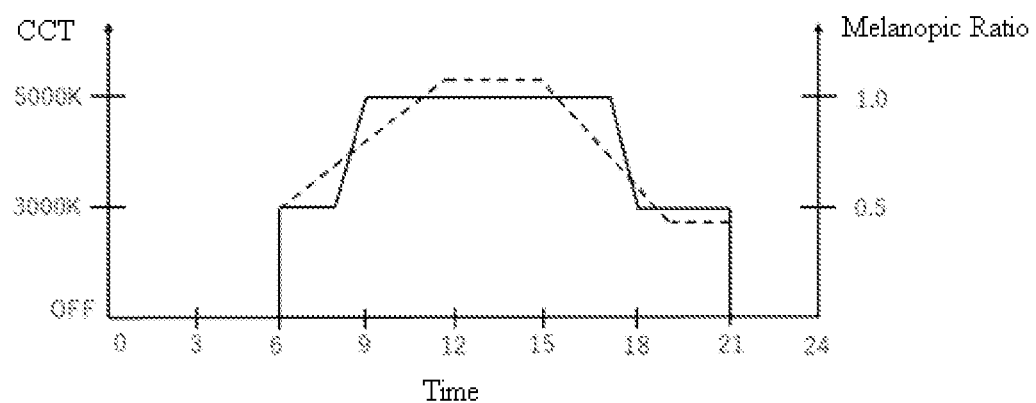
FIG. 4B is a diagram illustrating another example of the method of controlling illumination in the illumination device according to the first embodiment.

FIG. 4B illustrates an example of control for emitting light for illumination while changing the correlated color temperature and varying the MR value for a predetermined amount of time. Also in this example, similar to FIG. 4A, the predetermined amount of time controlled by the control device 20 is from 6:00 to 21:00.

Within a predetermined amount of time the control device 20 controls the light-emitting device 10 to change the correlated color temperature of the light emitted from the light-emitting device 10 in a range from 1000 K to 4500 K and vary the MR value in a range from 0.36 to 1.06. In FIG. 4B, the control device 20 changes the correlated color temperature by 2000 K from 3000 K to 5000 K, and then varies the MR value so that the difference between the maximum MR value and the minimum MR value is within a range from 0.50 to 0.70.

The control by the control device 20 includes control to emit light having the same correlated color temperature in a certain time period in the morning and in a certain time period in the afternoon, and to make the minimum value of the MR in the afternoon at the correlated color temperature smaller than the minimum value of the MR in the morning. The correlated color temperature is in a range from 2000 K to 4000 K. The correlated color temperature is the minimum correlated color temperature of the light emitted from the light-emitting device 10 under control of the control device 20. The time at which the MR is minimized at this correlated color temperature in the morning occurs between 6:00 and 10:00, and the time at which the MR is minimized at this correlated color temperature in the afternoon occurs between 16:00 and 21:00. On the basis of a typical business style in which business starts around 9:00 and ends around 17:00, even with the light having the same correlated color temperatures, the MR in the work closing time can be made smaller than that in the start time of the business and the closing time of the business.

The control device 20 emits light of a predetermined correlated color temperature so as to have an MR value lower than that of the standard light source at the correlated color temperature at a certain time, to have an MR value equal to that of the standard light source at the correlated color temperature at another certain time, and to have an MR value higher than that of the standard light source at the correlated color temperature at another certain time. As a result, it is possible to realize a range of the MR of the correlated color temperature when viewed from the standard light source, while suppressing a visible difference in the illumination.

The control device 20 temporally continuously changes the value of the correlated color temperature from a first value to a second value that is greater than the first value. The control device 20 temporally continuously changes the MR value from a third value to a fourth value that is greater than the third value. The time required for the value of the correlated color temperature to change from the first value to the second value by the control device 20 is shorter than the time required for the MR value to change from the third value to the fourth value. The control device 20 changes the value of the correlated color temperature from the first value to the second value at a shorter required time in the time period of changing the MR value from the third value to the fourth value. The third value is less than or equal to the MR value of the standard light source at the first value of the correlated color temperature, and the fourth value is greater than or equal to the MR value of the standard light source at the second value of the correlated color temperature. In this manner, it is possible to adjust the change in the correlated color temperature and the change in the MR, respectively, and thus, illumination in consideration of HCL can be provided in accordance with usage of the illumination.

The control device 20 causes the light-emitting device 10 to emit light having a correlated color temperature having the first value, the light having the same MR value as the MR value of the standard light source at a correlated color temperature lower than the correlated color temperature of the first value in a range from 500 K to 1000 K. The control device 20 can cause the light-emitting device 10 to emit light having a correlated color temperature having the first value, the light having an MR corresponding to the MR value of the standard light source at a correlated color temperature 500 K lower than the correlated color temperature of the first value.

The control device 20 causes the light-emitting device 10 to emit light having a correlated color temperature having the second value, the light having the same MR value as the MR value of the standard light source at a correlated color temperature higher than the correlated color temperature of the second value in a range from 500 K to 1500 K. The control device 20 can cause the light-emitting device 10 to emit light having a correlated color temperature having the second value, the light having an MR corresponding to the MR value of the standard light source at a correlated color temperature 500 K higher than the correlated color temperature of the second value, or having an MR corresponding to the MR value of the standard light source at a correlated color temperature 1000 K higher than the correlated color temperature of the second value, or having an MR corresponding to the MR value of the standard light source at a correlated color temperature 1500 K higher than the correlated color temperature of the second value.

Figure 4C:
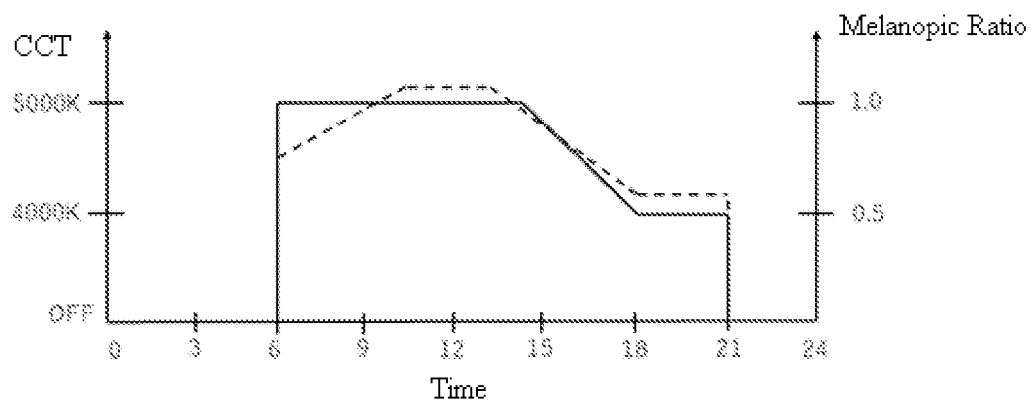
FIG. 4C is a diagram illustrating another example of the method of controlling illumination in the illumination device according to the first embodiment.

FIG. 4C illustrates an example of control for emitting light for illumination while changing the correlated color temperature and varying the MR value for a predetermined amount of time. Also in this example, similar to FIG. 4B, the predetermined amount of time controlled by the control device 20 is from 6:00 to 21:00. In the above description of the example of FIG. 4B, the content that does not cause inconsistency based on FIG. 4C can also be applied to the example of FIG. 4C.

The control device 20 controls the light-emitting device 10 to decrease the value of the correlated color temperature from the second value to the first value in the afternoon. Further, the control device 20 starts to decrease the MR value from the fourth value before the time at which the value of the correlated color temperature starts to decrease from the second value, and continuously changes the value of the correlated color temperature and the MR value so that the time when the value of the correlated color temperature becomes the first value and the time when the MR value becomes the third value coincide with each other. In FIG. 4C, the control device 20 sets the second value to 5000 K, sets the first value to 4000 K, sets the fourth value in a range from 1.0 to 1.15, and sets the third value in a range from 0.57 to 0.68.

Figure 4D:
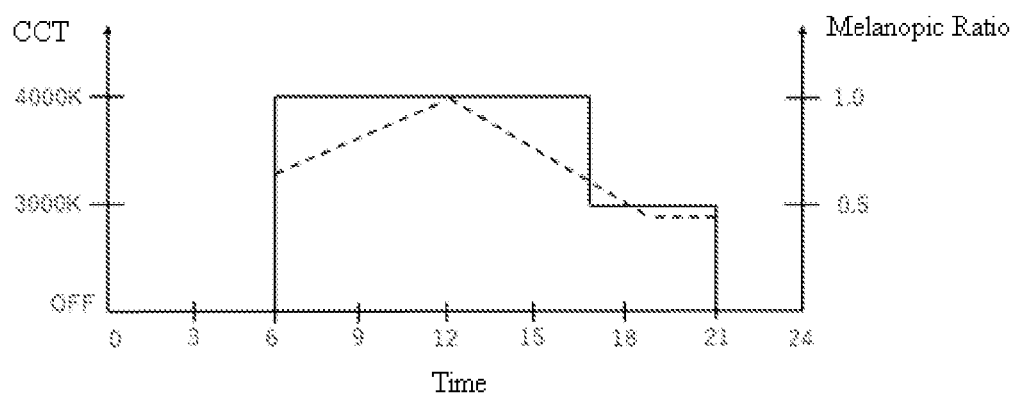
FIG. 4D is a diagram illustrating another example of the method of controlling illumination in the illumination device according to the first embodiment.

FIG. 4D illustrates an example of control for emitting light for illumination while changing the correlated color temperature and varying the MR value for a predetermined amount of time. Also in this example, similar to FIGS. 4B and 4C, the predetermined amount of time controlled by the control device 20 is from 6:00 to 21:00. In the above description of the example of FIG. 4B, the content that does not cause inconsistency based on FIG. 4D can also be applied to the example of FIG. 4D.

The control device 20 switches the value of the correlated color temperature from the second value to the first value not continuously but in an L-shape. On the other hand, the control device 20 continuously changes the value of the MR from the fourth value to the third value before and after the switching of the value of the correlated color temperature. Such control is possible because there is an overlapping portion between the range of the MR value that can be provided when the value of the correlated color temperature is set to the first value and the range of the MR value that can be provided when the value of the correlated color temperature is set to the second value. In this manner, even in a form of control in which the value of the correlated color temperature of the light for illumination is switched instantaneously, the value of the MR can be changed continuously, rather than abruptly, to provide illumination in consideration of HCL.

Note that "instantaneously" here means, for example, a time within 1 second. In addition, "instantaneously" may mean a time that can be said to be substantially sufficiently short with respect to the control time in one day, so for example, with the control time in one day being several hours or more, one minute or less may be regarded as "instantaneously". In addition, in the instantaneous switching, the control device 20 changes the correlated color temperature to 100 K or more within a time corresponding to "instantaneously". For example, the control device 20 can change the correlated color temperature to 300 K or more within a time corresponding to "instantaneously". The control device 20 can change the correlated color temperature within a range of a correlated color temperature that can be achieved by illumination light emitted from the illumination device 1. In contrast to changing "instantaneously", changing "continuously" means that the correlated color temperature is changed by 500 K or more over a period of 10 minutes or more, for example.

Figure 4E:
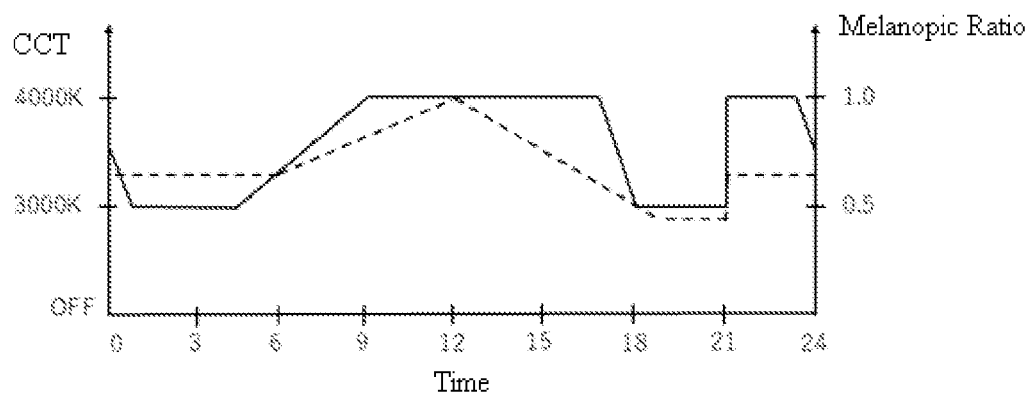
FIG. 4E is a diagram illustrating another example of the method of controlling illumination in the illumination device according to the first embodiment.

FIG. 4E illustrates an example of control for emitting light for illumination while changing the correlated color temperature and varying the MR value for a predetermined amount of time. In this example, the predetermined amount of time controlled by the control device 20 is from 0:00 to 24:00. For example, a place such as a factory where employees work in shifts and operate for 24 hours can be envisioned. In the above description of the example of FIG. 4B, the content that does not cause inconsistency based on FIG. 4E can also be applied to the example of FIG. 4E.

The control device 20 controls the light-emitting device 10 so that the correlated color temperature at a predetermined time after 18:00 is higher than the correlated color temperature at 18:00. This predetermined time is a time after 20:00 and before 24:00. This is determined based on, for example, the work starting time of the night shift. For example, the correlated color temperature of the light for illumination is increased according to the work start time for the night shift. Thereafter, by 6:00 on the next day, the control device 20 controls the light-emitting device 10 to emit light having a correlated color temperature lower than the correlated color temperature at the predetermined time. Further, the control device 20 keeps the MR value constant while changing the value of the correlated color temperature from this predetermined time to 3:00 on the next day. The MR value kept constant is in a range from 0.5 to 0.8. In other words, by making the MR value not as high as during daytime and making the MR value constant, the control device 20 creates a situation similar to nighttime in that the MR value is not varied while making it difficult to induce sleep. In this manner, it is possible to provide illumination in consideration of HCL while not compromising the work environment.

Next, an example of a specific configuration of the illumination device 1 having a wide variation range of the MR will be described. Note that the illumination device 1 can be manufactured not limited to the specific examples mentioned here.

Illumination Device 1

The illumination device 1 includes one or more light-emitting devices 10. The one or more light-emitting devices 10 includes a light-emitting element 39 such as a light-emitting diode, etc., or the light-emitting element 39 and a phosphor 41. Further, the light-emitting device 10 emits light from the light-emitting element 39, or mixed light of light from the light-emitting element 39 and light from the phosphor 41. The first light 11, the second light 12, the third light 13, and the fourth light 14 are emitted by the one or more light-emitting devices 10. Each of these light is the light from the light-emitting element 39, or the mixed light of light from the light-emitting element 39 and light from the phosphor 41. FIG. 5A illustrates an example of the light-emitting device 10 including the light-emitting element 39, and FIG. 5B illustrates an example of the light-emitting device 10 including the light-emitting element 39 and the phosphor 41.

FIG. 6 illustrates an example of chromaticity-coordinates of the first light 11, the second light 12, the third light 13, and the fourth light 14 in the chromaticity diagram of the CIE1931 color system. Hereinafter, a chromaticity-coordinate of the first light 11 is referred to as a first chromaticity point, a chromaticity-coordinate of the second light 12 is referred to as a second chromaticity point, a chromaticity-coordinate of the third light 13 is referred to as a third chromaticity point, and a chromaticity-coordinate of the fourth light 14 is referred to as a fourth chromaticity point.

The first chromaticity point is in a region defined by a first line segment, a second line segment, a purple boundary, and a spectrum boundary in a chromaticity diagram of a CIE1931 color system, the first line segment connecting a first point at which x is 0.280 and y is 0 in chromaticity-coordinates and a second point at which x is 0.280 and y is 0.250 in the chromaticity-coordinates, and the second line segment connecting the second point and a third point at which x is 0 and y is 0.250 in the chromaticity-coordinates.

The second chromaticity point is in a region defined by a third line segment, a fourth line segment, a fifth line segment, and the spectrum boundary in the chromaticity diagram of the CIE1931 color system, the third line segment connecting a fourth point at which x is 0.280 and y is 0.300 in the chromaticity-coordinates and a fifth point at which x is 0.280 and y is 0.600 in the chromaticity-coordinates, the fourth line segment connecting the fourth point and a sixth point at which x is 0 and y is 0.300 in the chromaticity-coordinates, and the fifth line segment connecting the fifth point and a seventh point at which x is 0 and y is 0.600 in the chromaticity-coordinates.

The third chromaticity point has an x-coordinate value greater than x-coordinate values of the first chromaticity point and the second chromaticity point in the chromaticity diagram of the CIE1931 color system. The value of the x-coordinate of the third chromaticity point is in a range from 0.250 to 0.500, and the value of the y-coordinate is 0.400 or more.

The fourth chromaticity point has an x-coordinate value greater than x-coordinate values of the first chromaticity point and the second chromaticity point, the x-coordinate value of the fourth chromaticity point being different from the x-coordinate value of the third chromaticity point in the chromaticity diagram of the CIE1931 color system. The value of the x-coordinate of the fourth chromaticity point is 0.400 or more, and the value of the y-coordinate is 0.500 or less.

For example, by adjusting the ratio between the first light 11 and the second light 12 using the first light 11 to the fourth light 14, it is possible to emit light for illumination with different MR values at the same correlated color temperature. Therefore, it is possible to perform control to vary the MR value at the same correlated color temperature.

FIG. 7 illustrates an example of emission spectra of the first light 11, the second light 12, the third light 13, and the fourth light 14. FIG. 8 illustrates another example of emission spectra of the first light 11, the second light 12, the third light 13, and the fourth light 14.

The first light 11 illustrated in FIG. 7 can be realized by, for example, the light-emitting element 39 that is a nitride semiconductor having an emission peak in a range from 400 nm to 470 nm, more preferably in a range from 420 nm to 460 nm, and the phosphor 41 that mainly contains an alkaline-earth-metal-halogen-phosphate phosphor having a composition represented by the formula $(Ca, Sr)_{10}(PO_4)_6Cl_2$:Eu and has an emission peak at 460 nm. The first light 11 has a peak wavelength in a range from 400 nm to 470 nm. The first light 11 has a first peak wavelength in a range from 400 nm to 450 nm and a second peak wavelength in a range from 430 nm to 470 nm. Note that the second peak wavelength is on the longer wavelength side than the first peak wavelength. The full width at half maximum in the emission spectrum of the first light 11 is 40 nm or more. Further, the full width at half maximum in the emission spectrum of the first light 11 is in a range from 40 nm to 150 nm. Alternatively, the full width at half maximum in the emission spectrum of the first light 11 is in a range from 50 nm to 100 nm.

The first light 11 illustrated in FIG. 8 can be realized by, for example, the light-emitting element 39 that is a nitride semiconductor having an emission peak in a range from 400 nm to 470 nm, more preferably in a range from 420 nm to 460 nm. The first light 11 has a peak wavelength in a range from 400 nm to 470 nm. The full width at half maximum in the emission spectrum of the first light 11 is 1 nm or more and less than 40 nm.

The second light 12 illustrated in FIG. 7 or 8 can be realized by, for example, the light-emitting element 39 that is a nitride semiconductor having an emission peak in a range from 410 nm to 470 nm, more preferably in a range from 420 nm to 460 nm, and the phosphor 41 that mainly contains an alkaline-earth-metal-aluminate-phosphate phosphor having a composition represented by the formula $Sr_4Al_{14}O_{25}$:Eu and has an emission peak at 495 nm. The second light 12 has a peak wavelength in a range from 470 nm to 510 nm. Also, the peak wavelength of the second light 12 is on the longer wavelength side than the peak wavelength of the first light 11. The full width at half maximum in the emission spectrum of the second light 12 is in a range from 50 nm to 150 nm.

The third light 13 illustrated in FIG. 7 or 8 can be realized by, for example, the light-emitting element 39 that is a nitride semiconductor having an emission peak in a range from 410 nm to 490 nm, and the phosphor 41 that mainly contains a rare-earth aluminate phosphor having a composition represented by the formula $Y_3(Al, Ga)_5O_{12}$:Ce and a composition represented by the formula $Y_3Al_5O_{12}$:Ce and has an emission peak in a range from 530 nm to 590 nm. The third light 13 has a peak wavelength in a range from 500 nm to 600 nm, or alternatively in a range from 520 nm to 570 nm. Also, the peak wavelength of the third light 13 is on the longer wavelength side than the peak wavelength of the second light 12. The full width at half maximum in the emission spectrum of the third light 13 is in a range from 50 nm to 150 nm.

The fourth light 14 illustrated in FIG. 7 or 8 can be realized by, for example, the light-emitting element 39 that is a nitride semiconductor having an emission peak in a range from 410 nm to 490 nm, and the phosphor 41 that mainly contains a rare-earth aluminate phosphor having a composition represented by the formula $Y_3Al_5O_{12}$:Ce, a rare-earth aluminate phosphor having a composition represented by the formula $(Y, Gd)_3; Al_5O_{12}$:Ce, and a silicon nitride phosphor having a composition represented by the formula $(Sr, Ca) AlSiN_3$:Eu. The fourth light 14 has a peak wavelength in a range from 550 nm to 700 nm, or alternatively in a range from 600 nm to 650 nm. Also, the peak wavelength of the fourth light 14 is on the longer wavelength side than the peak wavelength of the third light 13. The full width at half maximum in the emission spectrum of the fourth light 14 is in a range from 50 nm to 150 nm.

Table 3 illustrates the color rendering properties (Ra, R9, R12, R15) when the correlated color temperature is 6500 K and the MR is 1.10 based on the first light 11 to the fourth light 14 illustrated in FIG. 7, as well as the color rendering properties when the correlated color temperature is 6500 K and the MR is 1.10 based on the first light 11 to the fourth light 14 illustrated in FIG. 8. Note that this MR value is selected from the MR value at 6500 K of the standard light source.

TABLE 3

|  | Ra | R9 | R12 | R15 |
|---|---|---|---|---|
| FIG. 7 | 98.0 | 96.5 | 92.3 | 96.7 |
| FIG. 8 | 96.1 | 85.8 | 83.1 | 93.3 |

In both of FIGS. 7 and 8, a color rendering index of 80 or more is realized, whereby the illumination light has excellent color rendering properties. Further, as a whole, the value of the color rendering index is better in FIG. 7 than in FIG. 8. The first light 11 to the fourth light 14 illustrated in FIG. 7 have a color rendering index of 90 or more for Ra, R9, R12, and R15 when the correlated color temperature is 6500 K and the MR is 1.10. Since the full width at half maximum of the first light 11 is larger in the example of FIG. 7, it can be said that such a result is obtained.

Second Embodiment

An illumination control system 100 according to a second embodiment will be described. Although the control of the illumination light emitted from the illumination device 1 has been described in the first embodiment, a mode in which the illumination light emitted from the illumination device 1 is remotely controlled will be described in the second embodiment. The specific control mode of the correlated color temperature and the MR is the same as that described in the first embodiment.

Figure 9:
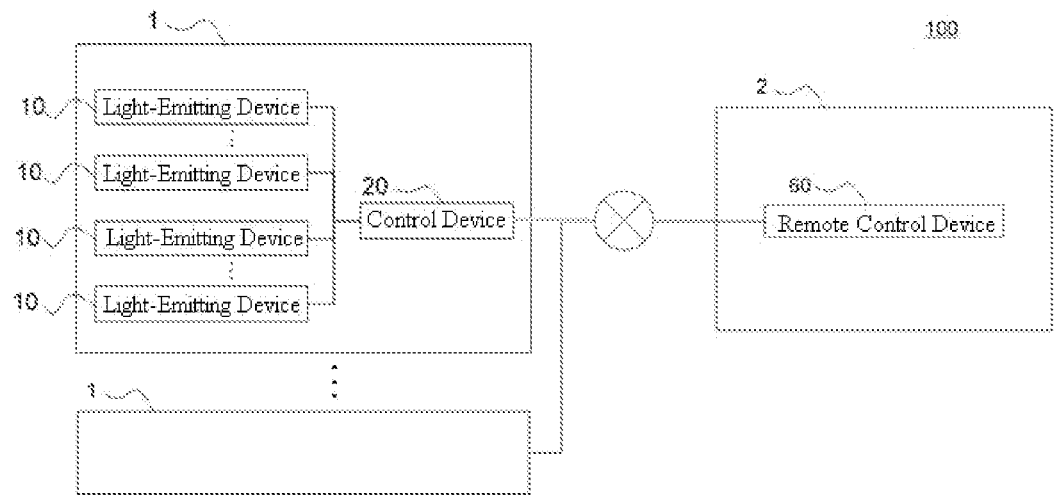
FIG. 9 is a schematic diagram illustrating an example of a system configuration of an illumination control system according to a second embodiment.

FIG. 9 illustrates an example of a system configuration diagram of the illumination control system 100. As illustrated in FIG. 9, the illumination control system 100 includes one or more illumination devices 1 and an illumination control device 2 that communicatively connects to the one or more illumination devices 1. The illumination control device 2 also includes a remote control device 60 for remotely controlling illumination by the illumination device 1.

Figure 10:
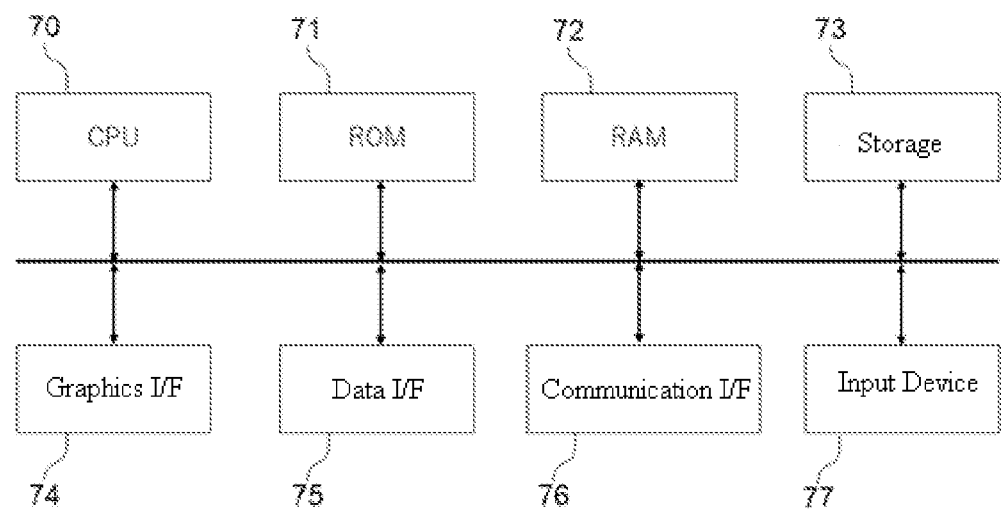
FIG. 10 is a schematic diagram illustrating an example of a hardware configuration of an information processing apparatus.

The illumination control device 2 can be implemented by an information processing device such as a computer, a server apparatus, and a smart device. FIG. 10 is a diagram illustrating an example of a hardware configuration of an information processing apparatus. In the information processing apparatus, a CPU 70, a ROM 71, RAM 72, a storage 73, a graphics I/F 74, a data I/F 75, a communication I/F 76, and an input device 77 are connected to a bus.

The storage 73 is a storage medium that can store data in a non-volatile manner. For example, hard disk drives, flash memory, etc. can be used. The CPU 70 is a processor that executes processing using the RAM 72 as a work memory according to programs stored in the ROM 71 and the storage 73. The graphics I/F 74 is an interface that converts a generated display control signal into a signal that can be displayed by the apparatus and outputs the signal.

The data I/F 75 is an interface for inputting data from the outside. For example, interfaces such as USB may be applied. The communication I/F 76 is an interface for communicating with a network using a prescribed protocol. The input device 77 receives a user input to output a predetermined control signal.

The remote control device 60 of the illumination control device 2 executes a process for transmitting a control instruction for controlling illumination light to the control device 20 of each of the illumination devices 1 to be controlled. The processing by the remote control device 60 is realized by, for example, the CPU 70 executing a program. The control device 20 of the illumination device 1 receiving the control instruction transmitted from the remote control device 60 controls the light-emitting device 10 according to the control instruction. In this manner, by enabling the illumination control device 2 to remotely control the plurality of illumination devices 1, it is possible to realize the illumination control system 100 that can collectively manage the illumination devices 1 on all floors or each floor and controlling illumination in, for example, an office building, etc.

Although the embodiments according to the present invention have been described above, the technical concept of the present invention is not limited to the specific embodiments described above. The present invention can be applied even without satisfaction with the requirements that all of the constituent elements disclosed in each embodiment are necessarily and sufficiently included. With a person skilled in the art or within a range of a degree of freedom of design in the technical field to which the invention pertains, the present invention can be applied even in a case in which a part of the constituent elements disclosed in the embodiments is not described in claims. This specification discloses the invention on the assumption that such is included.

Industrial Applicability

The illumination control system or illumination fixture described in each embodiment can be used in the field of illumination installed in an indoor space etc.

What is claimed is:
1. An illumination device comprising:
a light-emitting device configured to emit at least light of a first color temperature having a correlated color temperature in a range from 3500 K to 4000 K, the light having a melanopic ratio of a prescribed value within a variation range of the melanopic ratio in which a gap between a maximum value and a minimum value of the melanopic ratio at the first color temperature is 0.30 or more; and
a control device configured to control the light emitted from the light-emitting device, within a predetermined amount of time, by varying the melanopic ratio of the light by 0.3 or more within a first variation range encompassing at least a melanopic ratio value from 0.65 to 0.75, and adjusting the correlated color temperature of the light in a range from 0 K to ±500 K with respect to the first color temperature, wherein
the light-emitting device includes
a first light emitting portion configured to emit a first light, the first light emitting portion including a first light emitting element that is a nitride semiconductor having an emission peak in a range from 400 nm to 470 nm, and a first phosphor containing an alkaline-earth-metal-halogen-phosphate phosphor having a composition represented by the formula $(Ca, Sr)_{10}(PO_4)_6Cl_2$:Eu and has an emission peak at 460 nm,
a second light emitting portion configured to emit a second light, the second light emitting portion including a second light-emitting element that is a nitride semiconductor having an emission peak in a range from 410 nm to 470 nm, and a second phosphor containing an alkaline-earth-metal-aluminate-phosphate phosphor having a composition represented by the formula $Sr_4Al_{14}O_{25}$:Eu and has an emission peak at 495 nm,
a third light emitting portion configured to emit a third light, the third light emitting portion including a third light-emitting element that is a nitride semiconductor having an emission peak in a range from 410 nm to 490 nm, and a third phosphor containing a rare-earth aluminate phosphor having a composition represented by the formula $Y_3(Al, Ga)_5O_{12}$:Ce and a composition represented by the formula $Y_3Al_5O_{12}$:Ce and has an emission peak in a range from 530 nm to 590 nm, and
a fourth light emitting portion configured to emit a fourth light, the fourth light emitting portion including a fourth light-emitting element that is a nitride semiconductor having an emission peak in a range from 410 nm to 490 nm, and a fourth phosphor containing a rare-earth aluminate phosphor having a composition represented by the formula $Y_3Al_5O_{12}$:Ce, a rare-earth aluminate phosphor having a composition represented by the formula $(Y, Gd)_3Al_5O_{12}$:

Ce, and a silicon nitride phosphor having a composition represented by the formula (Sr, Ca)AlSiN$_3$:Eu, and the control device is configured to vary the melanopic ratio by adjusting a ratio between the first light, the second light, the third light, and the fourth light.

2. The illumination device according to claim 1, wherein the control device is configured to control the light-emitting device to emit the light including at least light having a correlated color temperature of 3000 K and light having a correlated color temperature of 5000 K, and to control the light emitted from the light-emitting device such that a difference between a minimum value of the melanopic ratio at the correlated color temperature of 3000 K and a maximum value of the melanopic ratio at the correlated color temperature of 5000 K is 0.5 or more.

3. The illumination device according to claim 1, wherein the control device is configured to control the light-emitting device to emit the light including at least light having a correlated color temperature of 2700 K and light having a correlated color temperature of 5000 K, and to control the light emitted from the light-emitting device such that a difference between a minimum value of the melanopic ratio at the correlated color temperature of 2700 K and a maximum value of the melanopic ratio at the correlated color temperature of 5000 K is 0.5 or more.

4. The illumination device according to claim 1, wherein the control device is configured to control the light-emitting device to emit the light including at least light having a correlated color temperature of 2700 K and light having a correlated color temperature of 4000 K, and to control the light emitted from the light-emitting device such that a difference between a minimum value of the melanopic ratio at the correlated color temperature of 2700 K and a maximum value of the melanopic ratio at the correlated color temperature of 4000 K is 0.4 or more.

5. The illumination device according to claim 1, wherein the control device is configured to control the light-emitting device to emit the light including at least light having a correlated color temperature of 2200 K and light having a correlated color temperature of 4000 K, and to control the light emitted from the light-emitting device such that a difference between a minimum value of the melanopic ratio at the correlated color temperature of 2200 K and a maximum value of the melanopic ratio at the correlated color temperature of 4000 K is 0.4 or more.

6. The illumination device according to claim 1, wherein the control device is configured to control the light-emitting device to emit the light including at least light having a correlated color temperature of 1800 K and light having a correlated color temperature of 3000 K, and to control the light emitted from the light-emitting device such that a difference between a minimum value of the melanopic ratio at the correlated color temperature of 1800 K and a maximum value of the melanopic ratio at the correlated color temperature of 3000 K is 0.3 or more.

7. The illumination device according to claim 1, wherein the control device is configured to control the light-emitting device to emit the light including at least light having a correlated color temperature of 3000 K and light having a correlated color temperature of 6500 K, and to control the light emitted from the light-emitting device such that a difference between a minimum value of the melanopic ratio at the correlated color temperature of 3000 K and a maximum value of the melanopic ratio at the correlated color temperature of 6500 K is 0.7 or more.

8. The illumination device according to claim 1, wherein the control device is configured to control the light-emitting device to emit the light including at least light having a correlated color temperature of 2700 K and light having a correlated color temperature of 6500 K, and to control the light emitted from the light-emitting device such that a difference between a minimum value of the melanopic ratio at the correlated color temperature of 2700 K and a maximum value of the melanopic ratio at the correlated color temperature of 6500 K is 0.8 or more.

9. The illumination device according to claim 1, wherein the light-emitting device includes one or more light-emitting devices configured to emit light of four or more chromaticity points including:

light of a first chromaticity point in a region defined by a first line segment, a second line segment, a purple boundary, and a spectrum boundary in a chromaticity diagram of a CIE1931 color system, the first line segment connecting a first point at which x is 0.280 and y is 0 in chromaticity-coordinates and a second point at which x is 0.280 and y is 0.250 in the chromaticity-coordinates, and the second line segment connecting the second point and a third point at which x is 0 and y is 0.250 in the chromaticity-coordinates;

light of a second chromaticity point in a region defined by a third line segment, a fourth line segment, a fifth line segment, and the spectrum boundary in the chromaticity diagram of the CIE1931 color system, the third line segment connecting a fourth point at which x is 0.280 and y is 0.300 in the chromaticity-coordinates and a fifth point at which x is 0.280 and y is 0.600 in the chromaticity-coordinates, the fourth line segment connecting the fourth point and a sixth point at which x is 0 and y is 0.300 in the chromaticity-coordinates, and the fifth line segment connecting the fifth point and a seventh point at which x is 0 and y is 0.600 in the chromaticity-coordinates;

light of a third chromaticity point having an x-coordinate value greater than x-coordinate values of the first chromaticity point and the second chromaticity point in the chromaticity diagram of the CIE1931 color system; and light of a fourth chromaticity point having an x-coordinate value greater than x-coordinate values of the first chromaticity point and the second chromaticity point, the x-coordinate value of the fourth chromaticity point being different from the x-coordinate value of the third chromaticity point in the chromaticity diagram of the CIE1931 color system.

10. The illumination device according to claim 9, wherein the light of the first chromaticity point has a full width at half maximum of 40 nm or more.

11. The illumination device according to claim 1, wherein the control device includes a remote control device configured to remotely control illumination by the illumination device.

12. An illumination device comprising:

a light-emitting device configured to emit at least light of a first color temperature having a correlated color temperature in a range from 3500 K to 4000 K, the light having a melanopic ratio of a prescribed value within a variation range of the melanopic ratio in which a gap between a maximum value and a minimum value of the melanopic ratio at the first color temperature is 0.30 or more; and a control device configured to control the light emitted from the light-emitting device, within a predetermined amount of time, by varying the melanopic ratio of the light by 0.3 or more within a first variation range encompassing at least a melanopic ratio value from 0.65 to 0.75, and adjusting the correlated color temperature of the light in a range from 0 K to ±500 K with respect to the first color temperature, wherein the light-emitting device includes a first light emitting portion configured to emit a first light, the first light emitting portion including a first light emitting element that is a nitride semiconductor having an emission peak in a range from 400 nm to 470 nm, a second light emitting portion configured to emit a second light, the second light emitting portion including a second light-emitting element that is a nitride semiconductor having an emission peak in a range from 410 nm to 470 nm, and a second phosphor containing an alkaline-earth-metal-aluminate-phosphate phosphor having a composition represented by the formula $Sr_4Al_{14}O_{25}$:Eu and has an emission peak at 495 nm, a third light emitting portion configured to emit a third light, the third light emitting portion including a third light-emitting element that is a nitride semiconductor having an emission peak in a range from 410 nm to 490 nm, and a third phosphor containing a rare-earth aluminate phosphor having a composition represented by the formula $Y_3(Al, Ga)_5O_{12}$:Ce and a composition represented by the formula $Y_3Al_5O_{12}$:Ce and has an emission peak in a range from 530 nm to 590 nm, and a fourth light emitting portion configured to emit a fourth light, the fourth light emitting portion including a fourth light-emitting element that is a nitride semiconductor having an emission peak in a range from 410 nm to 490 nm, and a fourth phosphor containing a rare-earth aluminate phosphor having a composition represented by the formula $Y_3Al_5O_{12}$:Ce, a rare-earth aluminate phosphor having a composition represented by the formula $(Y, Gd)_3Al_5O_{12}$:Ce, and a silicon nitride phosphor having a composition represented by the formula $(Sr, Ca)AlSiN_3$:Eu, and the control device is configured to vary the melanopic ratio by adjusting a ratio between the first light, the second light, the third light and the fourth light.

13. The illumination device according to claim 12, wherein the control device is configured to control the light-emitting device to emit the light including at least light having a correlated color temperature of 3000 K and light having a correlated color temperature of 5000 K, and to control the light emitted from the light-emitting device such that a difference between a minimum value of the melanopic ratio at the correlated color temperature of 3000 K and a maximum value of the melanopic ratio at the correlated color temperature of 5000 K is 0.5 or more.

14. The illumination device according to claim 12, wherein the control device is configured to control the light-emitting device to emit the light including at least light having a correlated color temperature of 2700 K and light having a correlated color temperature of 5000 K, and to control the light emitted from the light-emitting device such that a difference between a minimum value of the melanopic ratio at the correlated color temperature of 2700 K and a maximum value of the melanopic ratio at the correlated color temperature of 5000 K is 0.5 or more.

15. The illumination device according to claim 12, wherein the control device is configured to control the light-emitting device to emit the light including at least light having a correlated color temperature of 2700 K and light having a correlated color temperature of 4000 K, and to control the light emitted from the light-emitting device such that a difference between a minimum value of the melanopic ratio at the correlated color temperature of 2700 K and a maximum value of the melanopic ratio at the correlated color temperature of 4000 K is 0.4 or more.

16. The illumination device according to claim 12, wherein the control device is configured to control the light-emitting device to emit the light including at least light having a correlated color temperature of 2200 K and light having a correlated color temperature of 4000 K, and to control the light emitted from the light-emitting device such that a difference between a minimum value of the melanopic ratio at the correlated color temperature of 2200 K and a maximum value of the melanopic ratio at the correlated color temperature of 4000 K is 0.4 or more.

17. The illumination device according to claim 12, wherein the control device is configured to control the light-emitting device to emit the light including at least light having a correlated color temperature of 1800 K and light having a correlated color temperature of 3000 K, and to control the light emitted from the light-emitting device such that a difference between a minimum value of the melanopic ratio at the correlated color temperature of 1800 K and a maximum value of the melanopic ratio at the correlated color temperature of 3000 K is 0.3 or more.

18. The illumination device according to claim 12, wherein the control device is configured to control the light-emitting device to emit the light including at least light having a correlated color temperature of 3000 K and light having a correlated color temperature of 6500 K, and to control the light emitted from the light-emitting device such that a difference between a minimum value of the melanopic ratio at the correlated color temperature of 3000 K and a maximum value of the melanopic ratio at the correlated color temperature of 6500 K is 0.7 or more.

19. The illumination device according to claim 12, wherein the control device is configured to control the light-emitting device to emit the light including at least light having a correlated color temperature of 2700 K and light having a correlated color temperature of 6500 K, and to control the light emitted from the light-emitting device such that a difference between a minimum value of the melanopic ratio at the correlated color temperature of 2700 K and a maximum value of the melanopic ratio at the correlated color temperature of 6500 K is 0.8 or more.

20. The illumination device according to claim 12, wherein
the light-emitting device includes one or more light-emitting devices configured to emit light of four or more chromaticity points including:
light of a first chromaticity point in a region defined by a first line segment, a second line segment, a purple boundary, and a spectrum boundary in a chromaticity diagram of a CIE1931 color system, the first line segment connecting a first point at which x is 0.280 and y is 0 in chromaticity-coordinates and a second point at which x is 0.280 and y is 0.250 in the chromaticity-coordinates, and the second line segment connecting the second point and a third point at which x is 0 and y is 0.250 in the chromaticity-coordinates;
light of a second chromaticity point in a region defined by a third line segment, a fourth line segment, a fifth line segment, and the spectrum boundary in the chromaticity diagram of the CIE1931 color system, the third line segment connecting a fourth point at which x is 0.280 and y is 0.300 in the chromaticity-coordinates and a fifth point at which x is 0.280 and y is 0.600 in the chromaticity-coordinates, the fourth line segment connecting the fourth point and a sixth point at which x is 0 and y is 0.300 in the chromaticity-coordinates, and the fifth line segment connecting the fifth point and a seventh point at which x is 0 and y is 0.600 in the chromaticity-coordinates;
light of a third chromaticity point having an x-coordinate value greater than x-coordinate values of the first chromaticity point and the second chromaticity point in the chromaticity diagram of the CIE1931 color system; and
light of a fourth chromaticity point having an x-coordinate value greater than x-coordinate values of the first chromaticity point and the second chromaticity point, the x-coordinate value of the fourth chromaticity point being different from the x-coordinate value of the third chromaticity point in the chromaticity diagram of the CIE1931 color system.

21. The illumination device according to claim 12, wherein
the control device includes a remote control device configured to remotely control illumination by the illumination device.

* * * * *